United States Patent [19]

Nagafuji

[11] Patent Number: 4,542,476
[45] Date of Patent: Sep. 17, 1985

[54] ARITHMETIC LOGIC UNIT

[75] Inventor: Motonobu Nagafuji, Hadano, Japan

[73] Assignee: Hitachi, Ltd., Tokyo, Japan

[21] Appl. No.: 404,648

[22] Filed: Aug. 3, 1982

[30] Foreign Application Priority Data

Aug. 7, 1981 [JP] Japan ................... 56-122984

[51] Int. Cl.⁴ ............................................. G06F 7/38
[52] U.S. Cl. ............................................... 364/749
[58] Field of Search ............ 364/736, 749, 768, 778, 364/781, 784, 200 MS File, 900 MS File

[56] References Cited

U.S. PATENT DOCUMENTS

| 3,916,388 | 10/1975 | Shimp et al. | 364/200 |
| 4,021,655 | 5/1977 | Healy et al. | 364/749 |
| 4,023,023 | 5/1977 | Bourrez et al. | 364/736 |
| 4,224,682 | 9/1980 | Kindell et al. | 364/749 |
| 4,276,596 | 6/1981 | Flynn et al. | 364/778 |
| 4,384,340 | 5/1983 | Tague et al. | 364/736 |

Primary Examiner—James D. Thomas
Assistant Examiner—Dale M. Shaw
Attorney, Agent, or Firm—Antonelli, Terry & Wands

[57] ABSTRACT

An arithmetic logic unit processes a variable operand length instruction such as a decimal arithmetic operation instruction, a plurality of bytes at a time using a multi-byte depth arithmetic operation unit. Multi-byte data including first and second operands are supplied to the arithmetic logic unit through a suppressing circuit. The suppressing circuit suppresses unnecessary bytes other than operand bytes and suppresses all of the bytes of one of the operands when the one operand has been exhausted.

6 Claims, 17 Drawing Figures

| INPUT | | | OUTPUT | | | | | | | |
|---|---|---|---|---|---|---|---|---|---|---|
| a | b | c | d | e | f | g | h | j | k | l |
| 0 | 0 | 0 | 1 | 0 | 0 | 0 | 0 | 0 | 0 | 0 |
| 0 | 0 | 1 | 0 | 1 | 0 | 0 | 0 | 0 | 0 | 0 |
| 0 | 1 | 0 | 0 | 0 | 1 | 0 | 0 | 0 | 0 | 0 |
| 0 | 1 | 1 | 0 | 0 | 0 | 1 | 0 | 0 | 0 | 0 |
| 1 | 0 | 0 | 0 | 0 | 0 | 0 | 1 | 0 | 0 | 0 |
| 1 | 0 | 1 | 0 | 0 | 0 | 0 | 0 | 1 | 0 | 0 |
| 1 | 1 | 0 | 0 | 0 | 0 | 0 | 0 | 0 | 1 | 0 |
| 1 | 1 | 1 | 0 | 0 | 0 | 0 | 0 | 0 | 0 | 1 |

| INPUT | | | | OUTPUT | | | | | | | |
|---|---|---|---|---|---|---|---|---|---|---|---|
| m | n | p | q | r | s | t | u | v | w | x | y |
| 0 | 0 | 0 | 0 | 1 | 1 | 1 | 1 | 1 | 1 | 1 | 1 |
| 0 | 0 | 0 | 1 | 0 | 1 | 1 | 1 | 1 | 1 | 1 | 1 |
| 0 | 0 | 1 | 0 | 0 | 0 | 1 | 1 | 1 | 1 | 1 | 1 |
| 0 | 0 | 1 | 1 | 0 | 0 | 0 | 1 | 1 | 1 | 1 | 1 |
| 0 | 1 | 0 | 0 | 0 | 0 | 0 | 0 | 1 | 1 | 1 | 1 |
| 0 | 1 | 0 | 1 | 0 | 0 | 0 | 0 | 0 | 1 | 1 | 1 |
| 0 | 1 | 1 | 0 | 0 | 0 | 0 | 0 | 0 | 0 | 1 | 1 |
| 0 | 1 | 1 | 1 | 0 | 0 | 0 | 0 | 0 | 0 | 0 | 1 |
| 1 | X | X | X | 0 | 0 | 0 | 0 | 0 | 0 | 0 | 0 |

FIG. 13

1ST RUN

```
            3 2 1 + 0 0 0 0 0 0 0 0 0 0 0 0
            9 0 1 + 0 0 0 0 0 0 0 0 0 0 0 0
      +)                    (INITIAL CARRY)  0
(FINAL CARRY)  1  2 2 2 + 0 0 0 0 0 0 0 0 0 0 0 0
```

2ND RUN

```
            9 8 7 6 5 4 3 2 1 0 9 8 7 6 5 4
            0 0 0 0 0 0 9 0 1 2 3 4 5 6 7 8
      +)                    (INITIAL CARRY)  1
(FINAL CARRY)  0  9 8 7 6 5 5 2 2 2 3 3 3 3 3 3
```

3RD RUN

```
            0 0 0 0 0 0 0 0 0 0 0 0 3 2 1 0
            0 0 0 0 0 0 0 0 0 0 0 0 0 0 0 0
      +)                    (INITIAL CARRY)  0
            0 0 0 0 0 0 0 0 0 0 0 0 3 2 1 0
```

STORE OF RESULT

| | 3210 | 9876552223 33 3333 | 222+ |

FIG. 14a

|  | 1ST RUN | 2ND RUN | 3RD RUN |
|---|---|---|---|
| 1ST OPERAND EFFECTIVE LENGTH L1 | 11 | 9 | 1 |
| 2ND OPERAND EFFECTIVE LENGTH L2 | 6 | 4 | -4 |

FIG. 14b

|  | 2ND RUN | 3RD RUN |
|---|---|---|
| 1ST OPERAND EFFECTIVE LENGTH L1 | L1-(BC+1) | L1-8 |
| 2ND OPERAND EFFECTIVE LENGTH L2 | L2-(BC+1) | L2-8 |

FIG. 14c

|  | 1ST RUN | 2ND RUN | 3RD RUN |
|---|---|---|---|
| 1ST OPERAND | BYTES 2-7 | NO SUPPRESSION | BYTES 0-5 |
| 2ND OPERAND | BYTES 2-7 | BYTES 0-2 | ALL BYTES |

ARITHMETIC LOGIC UNIT

The present invention relates to an arithmetic logic unit, and more particularly to a high speed arithmetic logic unit for variable operand length instructions.

In a data processing system, a variable operand length instruction such as a decimal operation instruction is handled byte by byte by a one-byte depth arithmetic logic unit, or a plurality of bytes are handled at a time by a four or eight-byte depth arithmetic logic unit. In the former case, a less technical problem is involved but the ability to handle the instruction at high speed is low. In the latter case, a fast processing speed is attained but when lengths of operands are different and one of the operands is first exhausted, a special processing is necessary, control is complex and the processing time becomes long. When one of the operands is first exhausted, there has been attempted for a special processing that "0"'s are inserted into the bit positions of the exhausted operand corresponding to the byte depth of the arithmetic logic unit by a shifter so that the operand is processed with the other operand by a plurality of bytes at a time, or that "0"'s are inserted into the bit positions of the exhausted operand and operands are processed by a one-byte depth arithmetic logic unit one byte at a time.

It is an object of the present invention to provide an arithmetic logic unit which effectively utilizes a multi-byte depth arithmetic logic unit.

In accordance with one aspect of the present invention, an arithmetic logic means has multi-byte depth input means and simultaneously processes multi-byte input data. Of the input data to the arithmetic logic unit, unnecessary bytes other than effective operand bytes are suppressed by suppressing means, which includes means for suppressing all bytes of one of the operands when the one operand is exhausted. Accordingly, even when the one operand is exhausted, the multi-byte operation is simultaneously performed so that the multi-byte depth processing unit is effectively utilized.

The features of the present invention will be more apparent from the following detailed description taken in conjunction with the accompanying drawings, in which:

FIGS. 12 to 14 show specific examples for explaining the present invention.

Figure 1:
FIG. 1 shows an instruction format of a variable operand length instruction.

In the following description, an instruction format of a variable operand length instruction shown in FIG. 1 is considered. In FIG. 1, an OP field specifies the type of operation, such as addition, subtraction, multiplication or division, the L1 and L2 fields contain the effective length of a first operand less one byte and the effective length of a second operand less one byte, respectively, and the ADR1 and ADR2 fields contain the start addresses of the first and second operands, respectively, on a main storage. The L1 and L2 fields comprise four bits, respectively. (Accordingly, the maximum operand effective length is a 16-byte length.) It is assumed that the first operand having the length of L1+1 bytes starting from the address on the main storage specified by the ADR1 field and the second operand having the length of L2+1 bytes starting from the address on the main storage specified by the ADR2 field are added or subtracted with the right ends (least significant digits) thereof being aligned and the result is stored in the first operand field on the main storage. It is also assumed that the data transfer between an arithmetic logic unit and the main storage is effected at a eight-byte unit.

Figure 2:
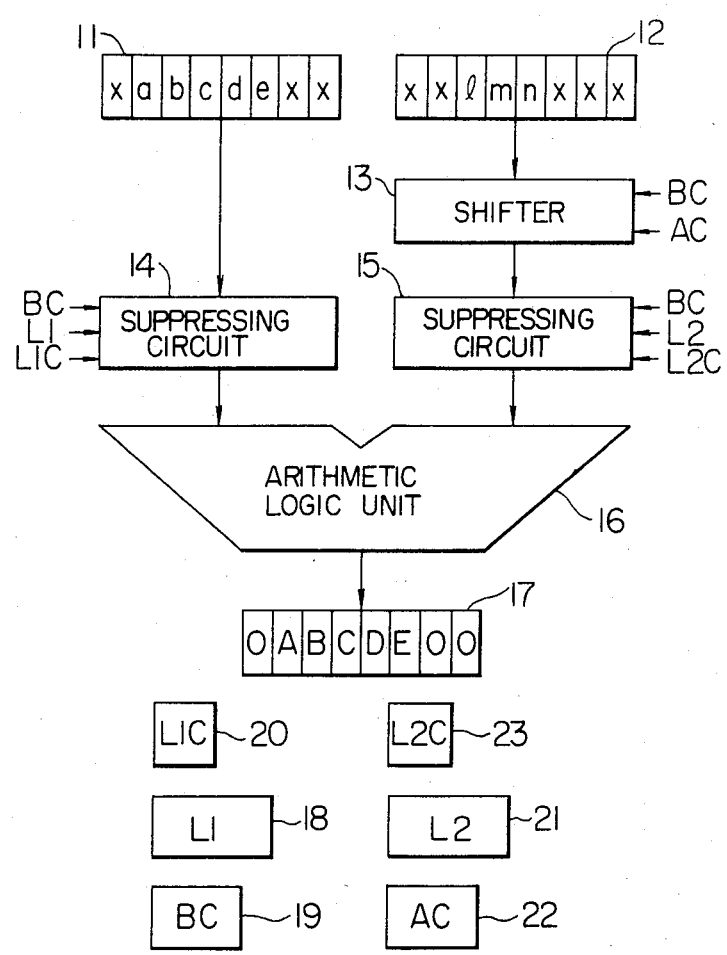
FIG. 2 shows a block diagram of one embodiment of the present invention.

FIG. 2 shows a block diagram of one embodiment of the present invention, in which numerals 11 and 12 denote eight-byte registers for storing first and second operands to be supplied to an arithmetic logic unit, numeral 13 denotes a shifter for aligning the position of the right end byte of the second operand to the position of the right end byte of the first operand, numerals 14 and 15 denote suppressing circuits for suppressing unnecessary bytes other than operand bytes of the data to be supplied to the arithmetic logic unit and assuring "0"'s in the suppressed positions, numeral 16 denotes the eight-byte depth arithmetic logic unit, numeral 17 denotes a result register, numerals 18 and 21 denote registers for storing effective lengths L1 and L2 of the first and second operands, respectively, provided by the instructions, the contents of the registers 18 and 21 being updated for each arithmetic logic operation as will be described later, numerals 19 and 22 denote registers for storing three low order bits BC and AC of the ADR1 field and the ADR2 field, respectively, of the instructions, the contents of the registers 19 and 22 indicating the byte positions, in the eight-byte blocks, of the right end bytes of the operands, and numerals 20 and 23 denote flip-flops L1C and L2C which indicate that the contents of the effective length registers 18 and 21 have changed to negative values, that is, the corresponding operands have been exhausted.

The eight-byte data of the register 11 is directly supplied to the suppressing circuit 14, to which BC, (L1) and L1C are also supplied. It inserts "0"'s into the positions unnecessary for the operation. In the example shown in FIG. 2, the first operand occupies the bytes 1 to 5. Accordingly, the suppressing circuit 14 suppresses the bytes 6 and 7 on the right of the right end of the operand specified by BC and the byte 0 on the left of the left end of the operand determined by BC and L1, and inserts "0"'s into those byte positions, and then supplies the data to the arithmetic logic unit 16. When L1C is set, the suppressing circuit 14 suppresses all of the eight bytes, as will be described in detail hereinlater.

The eight byte data of the register 12 is supplied to the shifter 13, which may be a conventional shifter. The shifter 13 receives BC and AC. The shifter 13 shifts the input eight byte data to the right or left depending on the difference between BC and AC to align the right end of the second operand to the position of the right end of the first operand. In the example shown in FIG. 2, the second operand occupies the bytes 2 to 4. Accordingly, the shifter 13 shifts the second operand to the right by one byte to align the right end of the second operand to the position of the right end of the first operand.

The output of the shifter 13 is supplied to the suppressing circuit 15 to which BC, L2 and L2C are also supplied. The operation of the suppressing circuit 15 is same as that of the suppressing circuit 14.

Figure 3:
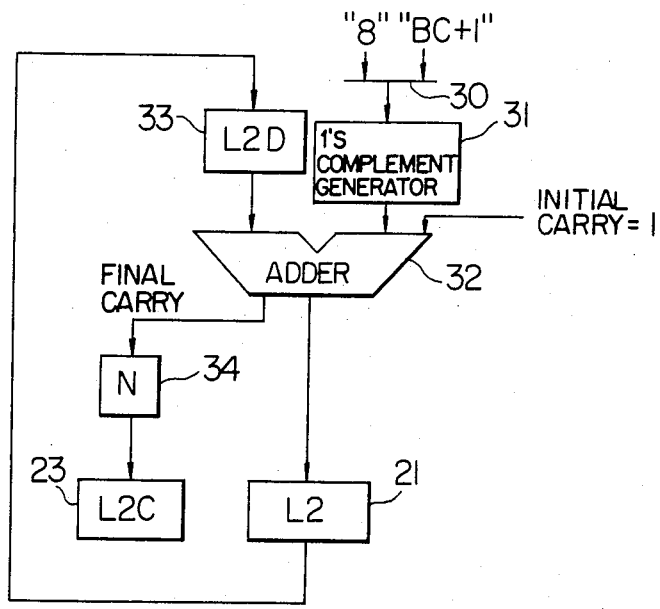
FIG. 3 shows a block diagram of an updating circuit for an operand effective length register.

FIG. 3 shows a circuit for updating L2 (effective length of the second operand). The content of the L2 register 21 is supplied to an adder 32 through a delay register L2D 33. A selector 30 receives BC+1 through the register 19 and a value of eight from a constant "8" generator. In the first run of the operand operation, BC+1 is selected and in the second and subsequent runs the value of eight is selected, and it is supplied to the adder 32 through a one's complement generator 31. A result of the subtraction is set in the L2 register 21. When the content of the L2D register 33 is larger than 8 or BC+1, a carry is generated on a final carry line, and when it is smaller no carry is generated. The final carry is supplied to the L2C flip-flop 23 through a NOT circuit 34 so that the L2C flip-flop 23 is set when the final carry is not generated. This means that the L2C flip-flop 23 is set when the content of the L2 register 21 changes to negative, that is, when the second operand has been exhausted.

Figure 4:
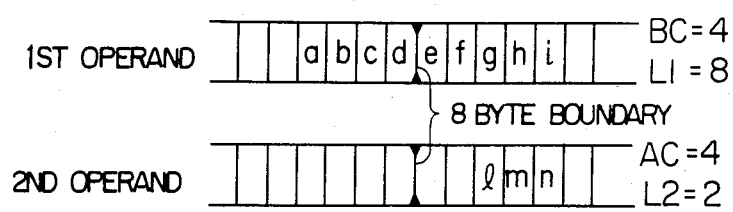
FIG. 4 shows a chart for explaining the operation of the circuit of FIG. 3.

FIG. 4 shows an example in which the first operand comprises nine bytes a–i which crosses an eight-byte boundary and BC=4, L1=8, and the second byte comprises three bytes l–n and AC=4, L2=2. For the sake of simplicity, BC is equal to AC. In the first run of the operation, "e f g h i" of the first operand and "l m n" of the second operand are processed. At this time, L2 and L2D are equal to 2 and they are subtracted by BC+1 or 5 in the first run so that L2 becomes −3. Accordingly, the L2C flip-flop 23 is set through the inverter 34 to indicate that the second operand has been exhausted in the second and subsequent runs.

While FIG. 3 shows the L2 updating circuit for the second operand, the L1 updating circuit for the first operand is constructed in the same manner.

The suppressing circuits 14 and 15 are now explained.

Table 1 shows positions of the unnecessary bytes on the right of the right end of the operand. For example, when BC is equal to 5, the byte positions 6–7 are unnecessary byte positions. (An example of the first operand of the register 11 shown in FIG. 2.)

TABLE 1

| Value of BC | | | | | | | |
|---|---|---|---|---|---|---|---|
| 0 | 1 | 2 | 3 | 4 | 5 | 6 | 7 |
| 1–7 | 2–7 | 3–7 | 4–7 | 5–7 | 6–7 | 7 | — |

Table 2 shows positions of the unnecessary bytes on the left of the left end of the operand. For example, when BC is equal to 5 and L1 is equal to 4, the byte position 0 is the unnecessary byte position. (An example of the first operand of the register 11 shown in FIG. 2.)

TABLE 2

| Operand effective length $L_1$ or $L_2$ | Value of BC | | | | | | | |
|---|---|---|---|---|---|---|---|---|
| | 0 | 1 | 2 | 3 | 4 | 5 | 6 | 7 |
| 0 | — | 0 | 0–1 | 0–2 | 0–3 | 0–4 | 0–5 | 0–6 |
| 1 | — | — | 0 | 0–1 | 0–2 | 0–3 | 0–4 | 0–5 |
| 2 | — | — | — | 0 | 0–1 | 0–2 | 0–3 | 0–4 |
| 3 | — | — | — | — | 0 | 0–1 | 0–2 | 0–3 |
| 4 | — | — | — | — | — | 0 | 0–1 | 0–2 |
| 5 | — | — | — | — | — | — | 0 | 0–1 |
| 6 | — | — | — | — | — | — | — | 0 |
| 7 or longer | — | — | — | — | — | — | — | — |

Accordingly, by supplying to the arithmetic logic unit 16 the first and second operands having zeros inserted in all of the unnecessary bytes shown in Tables 1 and 2 and all of the bytes of the operand which have been exhausted as indicated by L1C or L2C, a correct arithmetic operation result is obtained. The symbols "—" in the Tables 1 and 2 indicate that the unnecessary byte is absent.

Figure 5:
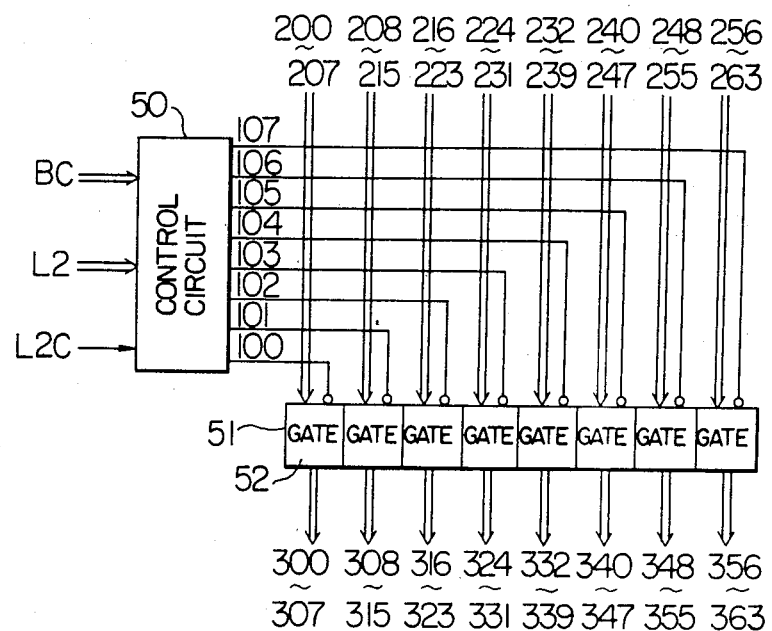
FIG. 5 shows a block diagram of a suppression circuit shown in FIG. 2.
Figure 6:
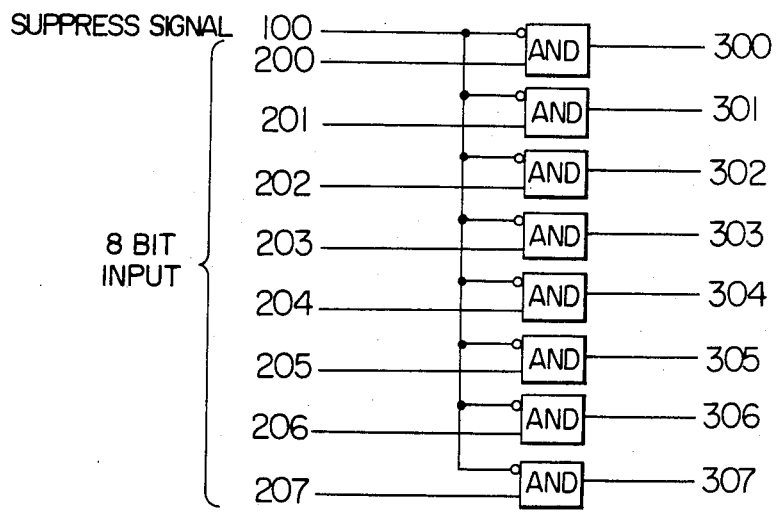
FIGS. 6 to 11 show block diagrams of gate circuits shown in FIG. 5 and control circuit therefor.

FIG. 5 shows a block diagram of the suppressing circuit 15 shown in FIG. 2. The suppressing circuit 14 has a similar construction. Numeral 50 denotes a control circuit of the suppressing circuit 15 which receives the inputs BC, L2 and L2C and produces unnecessary byte suppress signals 100–107 in accordance with the Tables 1 and 2 and L2C. Numeral 51 denotes an eight-byte depth gate circuit which receives the second operand inputs 200–263 from the shifter 13 and supplies to a second operand input side of the arithmetic logic circuit 16 outputs 300–363 having zeros inserted in the unnecessary bytes specified by the suppress signals 100–107 to the bytes 0–7. Numeral 52 denotes the byte 0 position of the gate circuit 51, which comprises eight AND gates as shown in detail in FIG. 6, in which the eight-bit input data signals 200–207 for the byte 0 are gated by the suppress signal 100 and the output data signals 300–307 are produced. When the byte 0 is the unnecessary byte which is to have zeros inserted, the suppress signal 100 is a logical "1" and the output data signals 300–307 are all zeros.

FIGS. 7 to 11 show examples of the control circuit 50 shown in FIG. 5.

Figure 7:
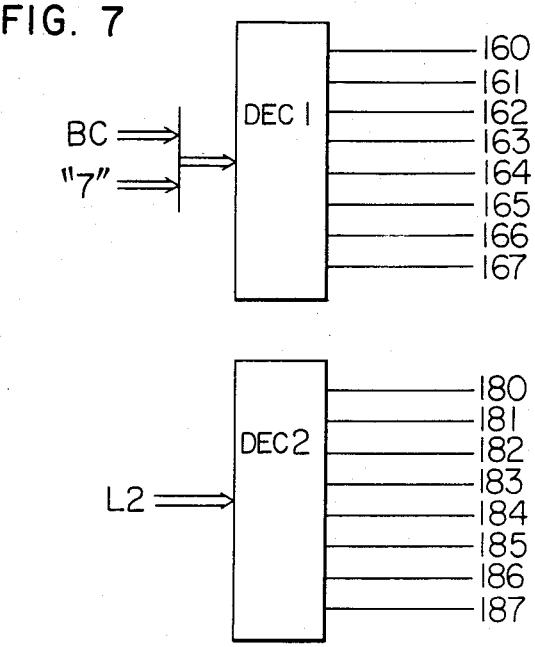
Figure 8A:
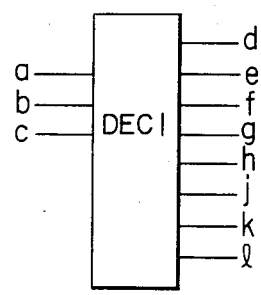
Figure 8B:
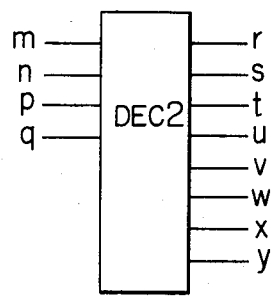

FIG. 7 shows a decoder DEC1 for BC or value 7 for indicating the right end byte position of the first operand, and a decoder DEC2 for the effective length L2 of the second operand. In the first run of the arithmetic logic operation, BC is selected as the input to the decoder DEC1, and "7" is selected in the second and subsequent runs. Relationships between the inputs and the outputs of the decoders DEC1 and DEC2 are shown in FIGS. 8a and 8b, respectively.

Figure 9:
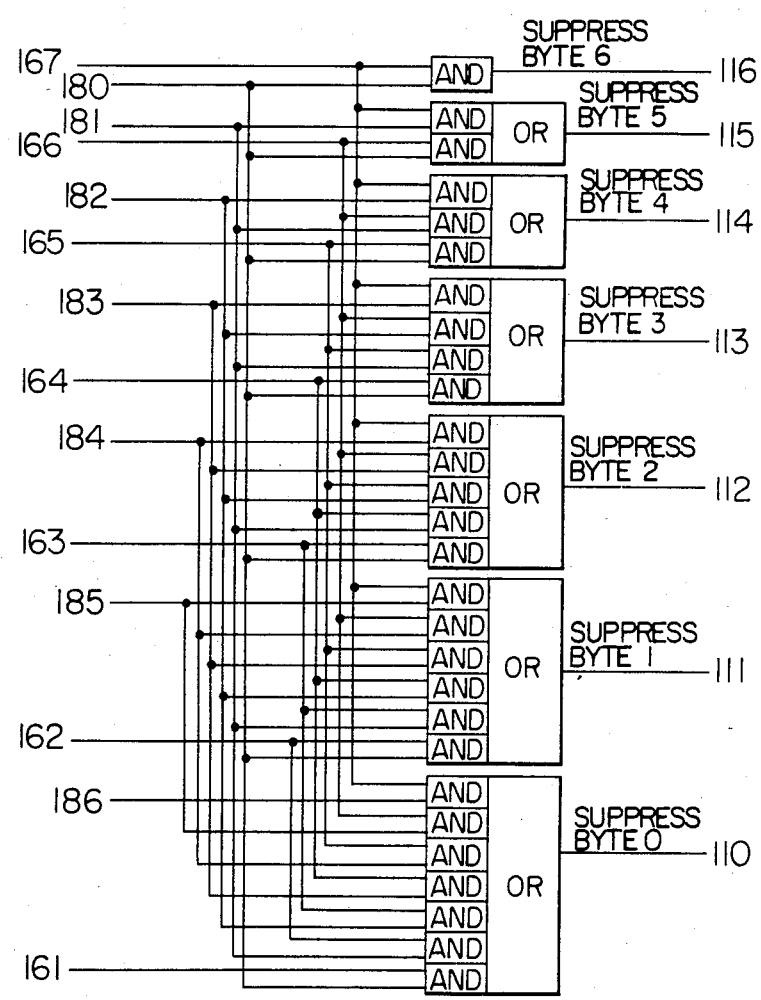

FIG. 9 shows an example of a logic circuit for determining the unnecessary bytes on the left of the left end of the operand shown in the Table 2. The decoder outputs 161–167 and 180–186 shown in FIG. 7 produce the suppress signals 110–116 for the bytes 0–6.

Figure 10:
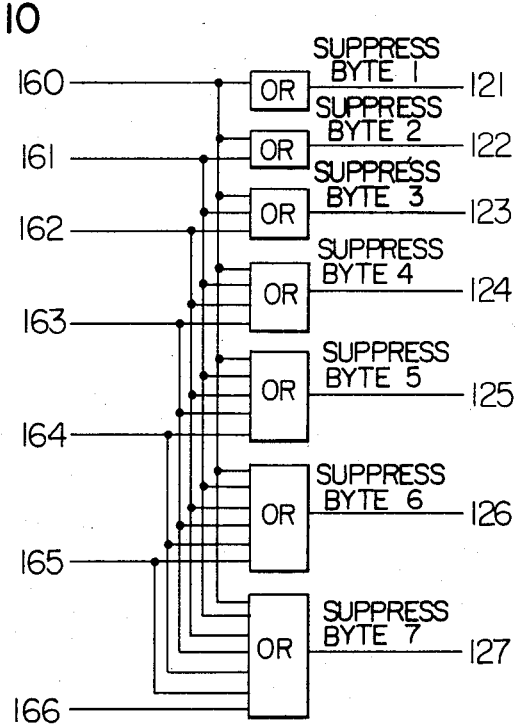

FIG. 10 shows an example of a logic circuit for determining the unnecessary bytes on the right of the right end of the operand shown in the Table 1. The decoder outputs 160–166 shown in FIG. 7 produce the suppress signals 121–127 for the bytes 1–7.

Figure 11:
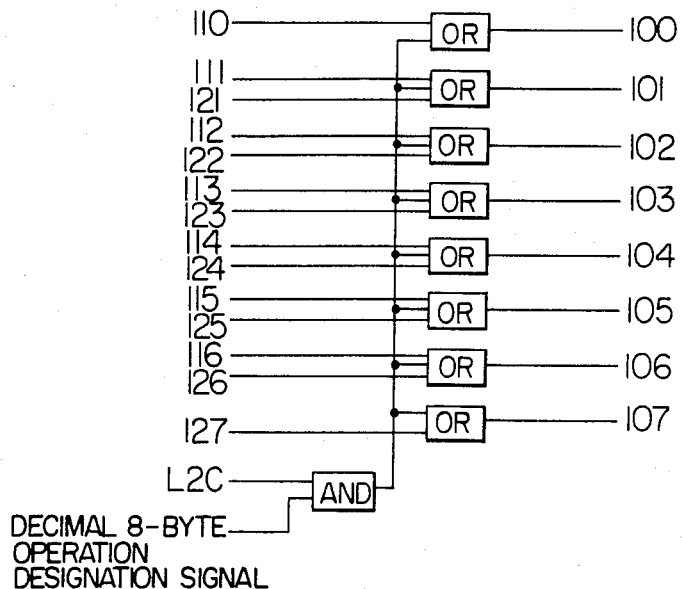

FIG. 11 shows OR circuits to which are inputted the unnecessary byte suppress signals 110–116 and 121–127 shown in FIGS. 9 and 10 and a suppress signal for suppressing all of the bytes in accordance with the output of the flip-flop L2C. The outputs 100–107 of the OR circuits are the outputs of the control circuit 50 shown in FIG. 5 or the supress signals for the bytes 0–7 of the input data to the arithmetic logic circuit 16. An AND circuit shown in FIG. 11 AND's the L2C and a decimal eight-byte operation designation signal.

When the length of one of the operands assumes a negative value, all of the bytes of the operand can be simultaneously suppressed. It is thus possible to process the remainder of the other operand simultaneously by the eight-byte depth arithmetic logic unit. More specifically, when one of the operands has been exhausted, the bytes of the other operand indicated by the effective length of the remainder thereof are supplied to the arithmetic logic unit while suppressing the other bytes, the operation is carried out by adding the most significant digit carry in the previous run to the other operand because the one operand is zero.

Figure 12:
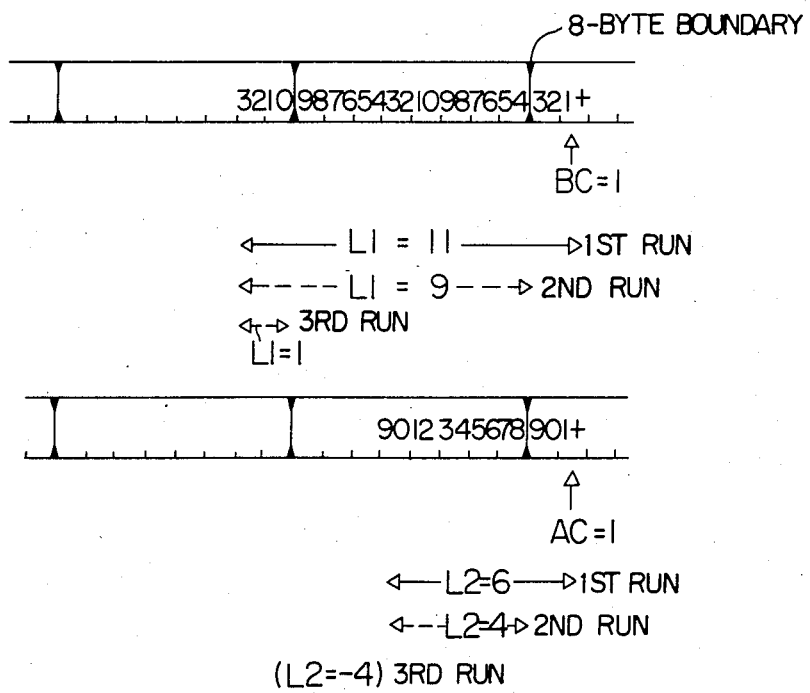

A specific example is now explained. FIG. 12 shows operands for a decimal add instruction. The first operand starts at the position counter (BC)=1 and the effective length register 18 has a count of 11. The second operand starts at the position counter (AC)=1 and the effective length register 21 has a count of 6. For the sake of simplicity, AC and BC are equal in the illustrated example. When they are not equal, the second operand is aligned to the first operand. As seen from FIG. 12, since the first operand extends over three eight-byte blocks, three runs of eight-byte operation are necessary. The contents ($L_1$, $L_2$) of the first and second operand effective length registers (18, 21) prior to respectively, the first, second and third runs of the operation, are shown in FIG. 14a. Those contents are obtained by subtracting from the current contents the number of bytes processed in each eight-byte boundary. As explained in FIG. 3, in the first run of the operation, two bytes are processed respectively. Accordingly, the count of $L_1$ prior to the second run is $L_1-(BC+1)=9$ and the content of $L_2$ prior to the second run is $L_2-(BC+1)=4$ as shown in FIG. 14b which shows the updated contents of $L_1$ and $L_2$. In the second run, eight bytes are processed. Accordingly, $L_1-(BC+1)-8=1$ and $L_2-(BC+1)-8=-4$ are the contents of $L_1$ and $L_2$ prior to the third run as shown in FIG. 14b, respectively. Since the content of $L_2$ is negative, the carry output of the adder 32 for $L_2$ shown in FIG. 3 is zero and the flip-flop L2C is first set to "1". As a result, the all-byte suppress signal for the second operand is turned on as explained above so that the all-zero second operand is supplied to the arithmetic logic circuit 16. FIG. 13 shows the operations for the decimal add instruction in the first to third runs. In the first run, two bytes including the rightmost byte are processed in the eight-byte depth. The bytes of the first and second operands on the right of BC+1 are suppressed. A resulting carry is "1" which is added to the least significant digit in the second run as an initial carry. In the second run, the first operand length is 9 and hence all of the eight bytes of the first operand is supplied to the arithmetic logic unit, and the second operand length ($L_2$) is 4 and BC is automatically regarded as 7 in the second and subsequent runs and hence five bytes from the right end are supplied to the arithmetic logic unit while the high order three bytes 0-2 are suppressed. A resulting carry is again "0" which is used as an initial carry in the next run. In the third run, the second operand is processed in accordance with the characteristic feature of the present invention. Since $L_2=-4$ is negative, all of the bytes of the second operand are suppressed and the remaining effective bytes of the first operand are supplied to the arithmetic logic unit while the other high order bytes are suppressed. A sum is calculated in the third run. The results in the respective runs are stored in the storage by appropriate data transfer means. FIG. 14c shows the arithmetic logic unit input suppress positions in the respective runs. The decimal addition can be carried out in the first, second and third runs by the same microfunction. In each run, the operation is carried out in the maximum byte depth or the eight-byte depth.

While the decimal add instruction has been explained, the logical operation can be carried out in the same manner, that is, the arithmetic logic unit input for the operand first exhausted is suppressed. In an example of a decimal subtraction, the zero suppression for the second operand in the above example is replaced by "1" set so that a high speed arithmetic logic circuit is attained in the same manner.

In accordance with the present invention, when the effective operand of the shorter operand length of the first and second operands has been exhausted, the other unprocessed operand can be processed in the multi-byte depth by the same microfunction. Accordingly, the decimal arithmetic operation and the logical operation can be carried out at a fast speed. In the prior art in which the byte-by-byte operation is carried out when one of the operands has first been exhausted, four cycles are needed assuming that the remaining operand length is 4 (midpoint of 1 and 8) on the average. In the present invention, only one cycle is needed, saving three cycles on the average.

What is claimed is:

1. An arithmetic logic unit comprising:
(a) data supplying means for supplying multi-byte depth data including first and second operands, respectively;
(b) suppressing means for suppressing bytes other than operand bytes of the data supplied from said supplying means, said suppressing means including means for suppressing all of the multi-bytes of one of said operands when said one operand has been exhausted;
(c) arithmetic logic means for simultaneously processing the multi-byte depth data supplied from said suppressing means; and
(d) means responsive to an operation of said arithmetic logic means for updating an operand length specified by an instruction for each multi-byte depth processing operation to produce a signal indicating whether the operand has been exhausted or not in accordance with the updated operand length, said signal being supplied to said suppressing means, wherein said means for producing the signal indicating whether the operand has been exhausted or not responds to the change of said updated operand length to a negative value.

2. An arithmetic logic unit according to claim 1 wherein said suppressing means responds to an operand address and the operand length specified by the operand and said signal indicating whether the operand has been exhausted or not.

3. An arithmetic logic unit according to claim 1, or 2 further comprising means for aligning the byte positions of said first and second operands supplied from said data supplying means.

4. An arithmetic logic unit according to claim 2 wherein said suppressing means includes first means for producing a signal to suppress the bytes on the right of the right end of the operand and the bytes on the left of the left end of the operand in accordance with the operand address and the operand length specified by the instruction, second means for producing the signal to suppress all of the bytes in response to the signal indicating that the operand has been exhausted, and gating means for suppressing the bytes in accordance with the signals from said first and second means.

5. An arithmetic logic unit according to claim 1, 2, or 4 wherein the suppressed bytes of the data are rendered to "0".

6. An arithmetic logic unit according to claim 1, 2, or 4 wherein the suppressed bytes of the data including said first operand are rendered to "0" and the suppressed bytes of the data including said second operand are rendered to "1".

* * * * *